United States Patent Office 3,038,909
Patented June 12, 1962

3,038,909
18-CHLORO-20-N-CHLORO-N-LOWER ALKYL-AMINO STEROID INTERMEDIATES
James F. Kerwin, Broomall, Pa., assignor to Smith Kline & French Laboratories, Philadelphia, Pa., a corporation of Pennsylvania
No Drawing. Original application Feb. 9, 1961, Ser. No. 88,034, now Patent No. 3,017,408, dated Jan. 16, 1962. Divided and this application Nov. 20, 1961, Ser. No. 153,721
6 Claims. (Cl. 260—397.3)

This invention relates to novel 18-dichlorosteroids having particular utility as intermediates and as having antiinflammatory activity. Further this invention also relates to new 18-hydroxyconanines prepared from these 18-dichlorosteroids. This invention also relates to the novel processes used to prepare these compounds.

The conanines are compounds derived from steroids and having utility as biologically active agents, such as progestational agents, as described in the prior literature (United States Patent No. 2,912,432). Conanines also are valuable steroidal intermediates as disclosed in United States Patents No. 2,959,586 and 2,960,503 and various copending applications under my name. The 18-hydroxy conanines of this invention have similar utility.

The conanine compounds of this invention are novel over the prior art in possessing a critical hydroxyl group at the secondary carbon attached to the nitrogen atom in the conanine nucleous. This carbon has been designated as the 18-position. The 18-dichloro-steroids are also obviously novel in possessing a gem-dihalomethyl moiety at position 13 of the steroid nucleus. This is an essential feature for preparing the 18-hydroxy steroids.

The 18-hydroxyconanines of this invention are prepared by treating 18-dichlorosteroids with base, such as an alkali metal hydroxide for instance sodium or potassium hydroxide, in a solvent in which the reactants are substantially soluble, preferably a lower aliphatic alcohol of less than 5 carbon atoms such as methanol or ethanol. The reaction temperature may vary over a wide range but is most conveniently run at the boiling point of the reaction mixture for from ½ to 6 hours. The base or an acid addition salt of the disclorosteriod may be used. As a practical matter either the base or the trifluoro acetic acid salt is usually employed.

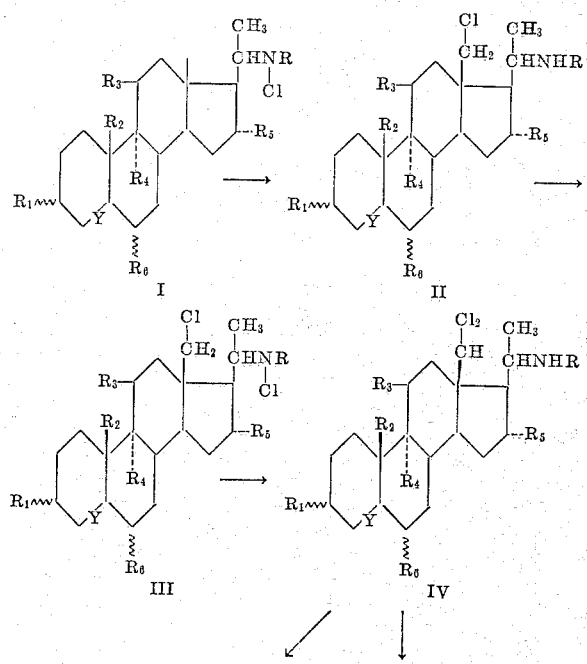

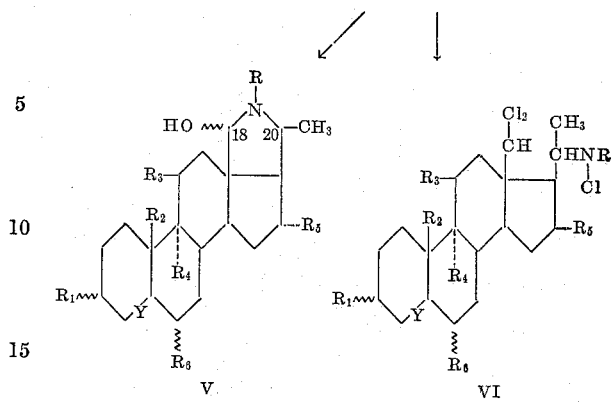

Formulas I–VI above represent exemplary compounds routes of synthesis of this invention when:

R is lower alkyl of from 1–4 carbon atoms inclusive.

$R_1$ is hydroxy, acyloxy, especially trifluoroacetoxy, or when taken together with the ring methylene group to which it is attached, keto.

$R_2$ is hydrogen or methyl; when a $\Delta^1$ vinylene moiety is present, of course, $R_2$ is necessarily methyl.

$R_3$ is hydrogen or when taken together with the ring methylene group to which it is attached, keto; in Formula V, $R_3$ is also hydroxy as described hereafter.

$R_4$ is hydrogen or fluoro.

$R_5$ is hydrogen, hydroxy, acyloxy, or methyl.

$R_6$ is hydrogen, methyl or fluoro.

Y is ethylene or vinylene.

Acyloxy radicals are those usual to the steroid art having a maximum of six carbon atoms preferably alkanoyloxy such as acetoxy. The trifluoroacetoxy group at position 3 is particularly advantageous as will be apparent. Preferably only one of $R_4$, $R_5$ and $R_6$ is a group other than hydrogen.

The preferred compounds of this invention are those in Formulas IV, V and VI in which $R_2$ is methyl and $R_4$, $R_5$ and $R_6$ are hydrogen. Particularly advantageous are those compounds having an oxygenated function at position 11, namely $R_3$, for instance at 11-keto in compounds of Formula IV and VI plus an 11-keto or hydroxy for compounds of Formula V. The substituents in the rings at positions other than 18 or 20 have been found not to be critical as long as such substituents are stable under the reaction conditions employed, for instance, stable to acid reaction conditions or to hypochlorite. For this reason any such compound with inert ring substituents is obvious and included in this invention. The compounds with a 3-keto$\Delta^{1,4}$ system in ring A when $R_4$ is methyl are also included in this invention. The compounds outlined hereabove are merely exemplary.

The 18-dichlorosteroids of Formula IV have unexpectedly been found to form by dissolving the appropriate 18-chloro-N-chloro intermediate of Formula III in trifluoroacetic acid and irradiating the solution with ultraviolet light under an inert atmosphere such as under nitrogen until a negative test for the N-chloro group is obtained. This test is most conveniently run by treating several drops of the reaction mixture with an excess of 5% potassium iodide-acetone-water solution. An almost colorless test solution is negative for positive halogen. The temperature of the reaction is usually from about 10° C. to about 40° C. most conveniently at room temperature. If a 3-hydroxyl group is present at the N→C rearrangement of the chloro atom in the synthesis, a substantial quantity of the 3-trifluoroacetoxy ester is formed. These compounds are stable, nicely crystalline and easy to isolate. Addition of trifluoroacetic anhydride to the reaction mixture increases the yield of ester.

The resulting 18-dichlorosteroids have unexpectedly been found to possess anti-inflammatory activity, particularly those having a 3-keto-Δ⁴ system in the A ring.

Other important steroidal intermediates are the 18,18,N-trichlorosteroids of Formula VI which have also been found to have biological activity as described above.

The 11-hydroxy-conanines of Formula V are prepared from their 11-keto congeners by forming a protective methyl ether by reaction of the 18-hydroxy-conanine with methanol with heating, reducing the 11-keto group using sodium borohydride and hydrolyzing the protective methoxy group with acid. Generally, acyl derivatives can be prepared or hydrolyzed by standard reaction methods.

The N,18-dichlorosteroids of Formula III used as starting material for the compounds of this invention are prepared by the reaction sequence outlined herebefore. The preparation of the 18-chlorosteroids of Formula II is disclosed in more detail in United States Patents No. 2,959,586, 2,795,174, 3,006,915 and 2,960,503 as well as in my application Serial No. 843,334, filed September 30, 1959. Briefly, the 18-chloro compounds are prepared from the known 20-keto compounds which are fully described in the prior art by the following steps: reductive alkylation with a primary lower alkylamine to form the 20-alkylamine derivative, N-chlorination in chloroform or methylene chloride solution with 5% sodium hypochlorite solution to form the N-chloro derivative (I), then ultraviolet irradiation in trifluoroacetic acid solution. N-chlorination in chloroform or methylene chloride with sodium hypochlorite then forms the desired N,18-dichloro derivative. While certain of the preliminary reactions for preparing necessary starting materials are described in detail in previous patents and applications several representative synthetic examples are presented hereafter for complete clarity.

In the positions where specific stereo designations have not been used mixtures of the two possible isomers, α and β, are obtained. For instance the methylamino radicals at 20 as isolated are sometimes mixtures with the α-form predominating. The pure α or β isomers crystallize readily and are therefore preferred. The mixtures of isomers usually are present as oils. The hydroxyl groups at position 18 of the conanines are usually mixtures of α and β isomers, however, in this case either isomer is equally useful and can be separated if desired by standard methods. In most uses of the 18-hydroxy-conanines as intermediates, however, the configuration is immaterial since subsequent chemical reactions destroy configuration at this point.

The important acid addition salts of the 18-dichloro intermediates of Formula IV are formed by recovering the free base from the trifluoroacetic acid salt usually isolated from the reaction product such as by dissolving the salt in aqueous ethanol and adding sodium carbonate solution to separate the free base. This compound is then reacted with acid in organic solvent such as ether to isolate the salt. Exemplary of such salts are the hydrochloride, sulfate, phosphate, maleate and others. The salts can be used as described as intermediates or for their biological activity.

The 18-hydroxy-conanines of Formula V act as pseudo bases in the presence of acids to form acid addition salts having the following distinctive structure in the conanine ring:

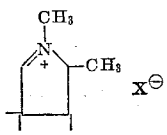

These compounds are included in this invention together with the conanines themselves. The acids used are as described hereabove for the dichloro compounds.

The term "conanine" is used generically to include the 20α or 20β configuration as well as the N-lower alkyl derivatives. It will be apparent to one skilled in the art that the reactions and intermediates disclosed herein are applicable to substituents other than those outlined above but not to others such as groups reactive under the reaction conditions.

The following examples will illustrate the compounds and processes of this invention and enable one skilled in the art to practice this invention fully. While in many of the following examples the free base or alcohols have been used, it should be understood as described above that it is often advantageous to use a salt and/or ester derivative such as the trifluoroacetoxy ester or trifluoroacetate salt. The 18-chloro starting materials are usually isolated and used as the ester salts.

*Example 1*

A mixture of 8 g. of progesterone-3-monoethylene ketal, 100 ml. of a solution containing 8.3 g. of methylamine in 100 ml. of ethanol, and 0.3 g. of platinum oxide is hydrogenated on a low pressure shaker for 7 hours. The filtered reaction mixture is evaporated. The residue is taken up in chloroform, then extracted into acetic acid several times together with water washing. The combined acid-water extracts are neutralized to give the desired 3-keto-20α-methylamino-4-pregnene, M.P. 159–166° C.

A mixture of 3.65 g. of the 20-methylamine is dissolved in 80 ml. of methylene chloride and 100 ml. of 5% sodium hypochlorite solution added with stirring over 15 minutes. The water layer is replaced by another hypochlorite portion and stirring continued for 15 minutes. The organic layer is washed and evaporated to give 3-keto-20α-N-chloromethylamino-4-pregnene, M.P. 135.5° C. (dec.).

A cooled solution of 250 ml. of trifluoroacetic acid is stirred for 45 minutes while 25 g. of the N-chloroamine is added. The reaction solution is nitrogen flushed and irradiated with ultraviolet light until the chloride test is negative, about 35 minutes. The solvent is removed, methanol added and the solution cooled to give 3-keto-18-chloro-20α-methylamino - 4 - pregnene trifluoroacetate, M.P. 185–192°.

A mixture of 1 g. of the 18-chloro salt, 20 ml. of methylene chloride and 50 ml. of 5% sodium hypochlorite solution is reacted at room temperature as above. The residue from the organic extracts is recrystallized to give 3 - keto-18-chloro-20α-N-chloromethylamino-4-pregnene, M.P. 128° C. (dec.), [α]$_D^{25}$ chloroform= +103.2°.

A solution of 3.4 g. of the N, 18-dichloro intermediate in 30 ml. of trifluoroacetic acid in the cold and flushed with nitrogen is irradiated for 15–20 minutes. The solvent is removed and the residue recrystallized using acetone to give 3-keto-18-dichloro-20α-methylamino-4-pregnene trifluoroacetic acid salt.

*Example 2*

A mixture of 2.6 g. of 3-keto-18-dichloro-20α-methylamino-4-pregnene trifluoroacetate (Example 1), 50 ml. of methanol and 12 ml. of 5% sodium hydroxide solution is heated at reflux under nitrogen for 2 hours. Dilution with water gives an oil which solidifies and which is recrystallized from acetone to give 18-hydroxy-4-conanene-3-one, M.P. 174-178° C.

*Example 3*

A solution of 1 g. of 3-keto-18-dichloro-20α-methylamino-4-pregnene trifluoroacetate in 20 ml. of methylene chloride is rapidly stirred for 30 minutes with 3 successive portions of 40 ml. of 5% sodium hypochlorite solution. The organic layer is washed, dried and evaporated to give a residue which, after recrystallization from methanol-methylene chloride, gives 3-keto-18-dichloro-20α-N-chloromethylamino-4-pregnene, M.P. 145° C. (dec.).

*Example 4*

A solution of 2.6 g. of 18-chloro-6α-fluoro-11-keto-20-methylaminoallopregnan-3β-ol is dissolved in 50 ml. of methylene chloride and reacted with several portions of 20 ml. of 5% sodium hypochlorite solution. The organic layer is washed, dried and evaporated to leave 18-chloro-6α-fluoro-11-keto-20-N-chloromethylamino - allopregnan-3β-ol. A mixture of 1 g. of the 18,N-dichloro compound is dissolved in 15 ml. of trifluoroacetic acid, flushed with nitrogen and irradiated. Evaporation of the solvent and trituration with methanol gives the desired 18-dichloro compound. This compound (500 mg.) is heated at reflux in 25 ml. of methanol-potassium hydroxide solution for 3 hours. Dilution with water gives the desired 3β,18-dihydroxy-6α-fluoroconanine-11-one. Another portion of the 18-dichloro intermediate (400 mg.) is reacted in 15 ml. of chloroform with 20 ml. of hypochlorite solution as described to give the 18,18,N-trichloro compound.

Example 5

A mixture of 2.5 g. of 18-chloro-3,11-diketo-20-methylaminoallopregnane trifluoroacetate salt in 45 ml. of methylene chloride is N-chlorinated at room temperature using several portions of 5% sodium hypochlorite solution. The organic layer is washed and evaporated to give 18-chloro-20-N-chloromethylamino-3,11-diketoallopregnane. This compound (2 g.) is irradiated in 30 ml. of trifluoroacetic acid at room temperature for 1½ hours. Evaporation of the solvent gives the desired 18-dichloro-20-methylamino - 3,11 - diketoallopregnane trifluoroacetate. A portion (750 mg.) of this compound is N-chlorinated using 20 ml. of methylene dichloride and 20 ml. portions of hypochlorite solution to give 18-dichloro-20-N-chloromethylamino-3,11-diketoallopregnane. Another portion (500 mg.) is reacted with dilute sodium hydroxide-methanol solution at reflux for 3 hours to give 18-hydroxy-conanine-3,11-dione.

Example 6

A mixture of 1.5 g. of 18-chloro-6α-fluoro-20-methylamino-11-keto-19-norallopregnan-3β-ol, 50 ml. of methylene chloride and several successive portions of 5% hypochlorite solution are reacted as described to give the N-chloro analogue which (1 g.) is irradiated in trifluoroacetic acid solution to form the 18-dichloro compound. This intermediate is divided into two portions. One (200 mg.) is heated at reflux in 15 ml. of methanolic potassium hydrochloride to give, upon quenching in water, 6α-fluoro-3β,18-dihydroxy-19-norconanine-11 - one, the other is dissolved in methylene chloride and reacted with hypochlorite solution to give the N,18,18-trichloro compound.

Example 7

A mixture of 2.3 g. of 6β,9α-difluoro-18-chloro-20-methylamino-11-keto-allopregnan-3β-ol, 75 ml. of chloroform and several 25 ml. portions of hypochlorite solution are reacted as described above to give the N-chloro analogue which (1.8 g.) is then irradiated in 50 ml. of trifluoroacetic acid to give the desired 6β,9α-difluoro-18-dichloro-20-methylamino-11-keto-allopregnan-3β-ol. The dichloro compound (1 g.) is reacted with 60 ml. of methanolic sodium hydroxide solution at reflux for 2½ hours to give 6β,9α-difluoro-3β,18-dihydroxy-conanine-11-one.

Example 8

A mixture of 1.5 g. of 11-keto-20-butylamino-18-chloro-19-norallopregnan-3β-ol in 75 ml. of methylene chloride is N-chlorinated with three 20 ml. portions of hypochlorite solution to give the N-chloro intermediate which is irradiated in trifluoroacetic acid to give the desired 20 - butylamino-18-dichloro-11-keto-19-norallopregnan-3β-ol. A portion of this material (1.2 g.) is heated at reflux in dilute ethanolic sodium hydroxide solution for 3 hours. Dilution with water gives the N-butyl-3β,18-dihydroxy-19-norconanine-11-one. Another portion of the dichloro intermediate (500 mg.) is reacted with several portions of hypochlorite solution in chloroform to give the N-chloro derivative.

Example 9

A mixture of 900 mg. of 3β-acetoxy-18-chloro-9β-fluoro-20-methylamino-11-keto-allopregnane in 20 ml. of methylene chloride is stirred rapidly with several portions of 10 ml. of 5% sodium hypochloride solution to give the N-chloro derivative which is irradiated in trifluoroacetic acid to give the desired 3β-acetoxy-18-dichloro-9α-fluoro-20-methylamino - 11 - ketoallopregnane. This compound (200 mg.) is heated for 1 hour under reflux in 15 ml. of methanolic sodium hydroxide to give, upon quenching in water, 9α-fluoro-3β,18-dihydroxyconanine-11-one. The trichloro compound is prepared as described above.

Example 10

To 7.2 g. of 5α-hydroxy-6β-methyl-3,11,20-allopregnantrione in 100 ml. of methanol is added 0.4 g. of sodium borohydride dissolved in pyridine. After 10 minutes an excess of dilute hydrochloric acid is added and the mixture extracted with methylene chloride. Evaporation of the solvent and chromatography of the residue over alumina yields 3β,5α-dihydroxy-6β-methyl-11,20-allopregnandione.

The dione prepared as above (18.0 g.) and 0.5 g. of platinum oxide are added to 200 ml. of ethanol containing 10% w./w. of methylamine and the mixture hydrogenated until one mole of hydrogen is absorbed. The catalyst is removed by filtration and the filtrate evaporated to dryness. Treatment of the residue with chloroform-acetic acid then neutralizing the acid extract gives 3β,5α - dihydroxy - 6β - methyl - 20α - methylaminoallopregnan-11-one.

A solution of 7.6 g. of the amine in 500 ml. of anhydrous toluene and 100 ml. of cyclohexanone is heated at reflux and a solution of 25.0 g. of aluminum isopropoxide in 100 ml. of toluene is added dropwise with stirring. Refluxing is continued for two hours, 10 ml. of glacial acetic acid is added and the mixture steam distilled. The residue is made basic, taken into chloroform. The organic extracts are shaken with dilute acid. The acid extracts are made neutral to give 3,11-diketo-6α-methyl-20-methylamino-4-pregnene.

A solution of 6.0 g. of 3,11-diketo-6α-methyl-20-methylamino - 4 - pregnene in 300 ml. of chloroform is stirred with 300 ml. of 5% sodium hypochlorite solution for one hour. The hypochlorite is removed and the treatment repeated. The chloroform layer is separated, washed with water, dried and evaporated to give 3,11-diketo - 6α - methyl - 20 - (N - methyl - N - chloroamino)-4-pregnene.

The above N-chloroamine (6.6 g.) is dissolved in 65 ml. of redistilled trifluoroacetic acid and irradiated with ultraviolet light under nitrogen for 40 minutes. The trifluoroacetic acid is evaporated in vacuo to give crude 18 - chloro - 3,11 - diketo - 6α - methyl - 20 - methylamino-4-pregnene. The 18-chloro derivative (4.5 g.) is dissolved in methylene chloride and reacted with hypochlorite solution to give the N-chloro which (3 g.) is irradiated in trifluoroacetic acid to give 18-dichloro-3,11-diketo - 6α - methyl - 20 - methylamino - 4 - pregnene. This compound (1 g.) is heated at reflux in methanolic sodium hydroxide for 3 hours to give 6α - methyl - 18-hydroxy-4-conanene-3,11-dione.

Example 11

To a solution of 5–6 g. of methylamine in 100 ml. of ethanol is added 6.0 g. of 3β-hydroxy-19-nor-5-pregnen-20-one and 0.2 g. of platinum oxide and the mixture is hydrogenated until one mole of hydrogen is absorbed. The catalyst is filtered off and the filtrate evaporated to dryness. The residue is taken up in chloroform and extracted with dilute acetic acid. The acid extract is made basic with dilute sodium hydroxide and the free amine isolated. Recrystallization gives 3β-hydroxy-20α-methylamino-19-nor-5-pregnene.

Following the general reaction procedures described above, the amine (7.5 g.) is oxidized with aluminum isopropoxide in toluene and cyclohexanone to give the 3-keto-20-methylamino-19-nor-4-pregnene. A solution of 5.0 g. of the amine in methylene chloride is treated with 5% sodium hypochlorite solution to give the N-chloroamine which is dissolved in 70 ml. of trifluoroacetic acid and irradiated with ultraviolet light to yield the 18-chloro compound.

This compound (3.6 g.) is reacted with hypochlorite to give the N-chloro compound which (2.3 g.) in turn is reacted with irradiation in trifluoroacetic acid to give 18-dichloro-3-keto-20-methylamino-19-nor-4-pregnene. This compound (750 mg.) is reacted with hypochlorite again to give the N-chloro compound. Another portion (1.5 g.) is heated at reflux for 1 hour in ethanolic potassium hydroxide to give 18-hydroxy-19-nor-4-conanene-3-one.

*Example 12*

Fifteen grams of 3α-hydroxypregnan-11,20-dione is dissolved in 200 ml. of ethanol containing 15–20 g. of methylamine, and the clear solution is allowed to stand for five hours. It is then shaken with 1.0 g. of platinum oxide catalyst and hydrogen at an initial pressure of 50 p.s.i. Hydrogenation commences after an induction period of one-half to one hour. When one mole of hydrogen is absorbed, the hydrogenation stops. The catalyst is filtered off and the alcohol is removed on the steam bath, the last traces off in vacuo. The residue is taken up in dilute hydrochloric acid and extracted three times with ether to remove nonbasic material. The amine, regenerated by the addition of alkali, is extracted with ether. The ether solution of the amine is washed twice with saturated salt solution, dried over sodium sulfate and then concentrated to ca. 50–60 ml. Upon cooling, crystals develop which are filtered and washed with cold ether to yield 3α-hydroxy-20-methylaminopregnan-11-one, M.P. 136–143° C.

A solution of 6.0 g. of 3α-hydroxy-20-methylaminopregnan-11-one in 300 ml. of chloroform is stirred with 300 ml. of 5% sodium hypochlorite solution for one hour. The hypochlorite is removed and the treatment repeated. The chloroform layer is separated, washed with water, dried and evaporated to give 3α-hydroxy-20-(N-methyl-N-chloroamino)-pregnan-11-one. The 20α and 20β isomers are separated by fractional recrystallization.

The above N-chloroamine (6.6 g.) is dissolved in 65 ml. of redistilled trifluoroacetic acid and irradiated with ultraviolet light under nitrogen for 40 minutes. The trifluoroacetic acid is evaporated in vacuo and the residual 3α-hydroxy-18-chloro-20-methylaminopregnan-11-one ester salt is reacted again with hypochlorite and rearranged with irradiation as described to give 11-keto-18-dichloro-20α or 20β-methylaminopregnan-3α-ol ester.

The dichloro compound (1.3 g.) is once again N-chlorinated to give the N,18,18-trichloro compound. Another portion (3.5 g.) is heated at reflux in isopropanolic sodium hydroxide to give upon quenching in water 3α,18-dihydroxy-5β-conanine-11-one or the 20 isomer.

*Example 13*

A mixture of 17.3 g. of 3α-hydroxy-16α-methyl-11,20-pregnadione and 0.5 g. of platinum oxide in 200 ml. of ethanol containing about 10% w./w. of methylamine is hydrogenated until the theoretical hydrogen absorption has occurred. The catalyst is filtered off and the filtrate is evaporated to dryness. The residue is taken up in choloroform, extracted with dilute acetic acid and the acid extract is made basic with dilute sodium hydroxide. Recrystallization of the separated free base gives 3α-hydroxy-16α-methyl-20α-methylaminopregnan-11-one. This compound (13 g.) is reacted with hypochlorite as described above to give 3α-hyroxy-16α-methyl-20-(N-methyl-N-chloro-amino)-pregnan-11-one which is dissolved in 150 ml. of trifluoroacetic acid and irradiated with ultraviolet light for 40 minutes. The solvent is evaporated to give the 18-chloro compound which is immediately reacted with hypochlorite in methylene chloride to form the N-chloro compound then irradiated to form the 18-dichloro intermediate.

This compound (1 g.) is reacted in chloroform with successive portions of 5% sodium hypochlorite to give 11-keto-16α-methyl-20-N-chloromethylamino-18-dichloro-pregnan-3α-ol.

Another portion (3.2 g.) is heated at reflux in methanolic sodium hydroxide for 2 hours. Quenching in water gives 3α,18-dihydroxy-16α-methyl-5β-conanine-11-one.

*Example 14*

3α,16α-diacetoxy-20-pregnanone (16.6 g.) and 0.5 g. of platinum oxide are added to 200 ml. of ethanol containing 10% w./w. of methylamine and the mixture is hydrogenated until the theoretical amount of hydrogen is absorbed. The catalyst is filtered off and the filtrate evaporated to dryness. The residual 20-methylamines are further worked up as described in Example 12 to give 3α,16α-diacetoxy-20α-methylaminopregnane. This secondary amine is N-chlorinated with hypochlorite solution, irradiated in trifluoroacetic acid to the 18-chloro compound, N-chlorinated and finally irradiated to give the desired 18-dichloropregnan-3α,16α-diol diacetate trifluoroacetic acid salt.

This compound (2 g.) is again N-chlorinated to give the N,18,18-trichloro compound. Another portion (3.3 g.) is heated at reflux for 2 hours in methanolic alkali to give 3α,16α,18-trihydroxy-5β-conanine.

*Example 15*

Similarly to the above compounds the following syntheses are carried out: 3β-hydroxy-11,20-allopregnanedione to 3β-hydroxy-18-chloro-20-methylamino-11-allopregnane to the 18-dichloro intermediate, the 18,18,N-intermediate as well as 3β,18-dihydroxyconanine-11-one. 3α-hydroxy-6α-methyl-18-chloro-20-methylamino-11-pregnanone to the N-chloro to the 18-dichloro, the N,18,18-trichloro and ultimately to the 3α,18-dihydroxy-6α-methyl-5β-conanine-11-one. 3β-hydroxy-19-nor-5-pregnen-20-one to 3β,5α-dihydroxy-6α-methyl-19-norallopregnan-20-one to 20α-methylamino to 3-keto-6α-methyl-20-methylamino-19-nor-4-pregnene to the N-chloro to 18-chloro to N,18-chloro to 18-dichloro to N,18,18-trichloro as well as ultimately to 18-hydroxy-6α-methyl-19-nor-4-conanene-3-one.

*Example 16*

To a solution of methylamine in 100 ml. of ethanol (10% w./w.) is added 9.3 g. of 3β-acetoxy-5-pregnen-11,20-dione and 0.25 g. of platinum oxide. The mixture is then hydrogenated until one mole of hydrogen is absorbed. The catalyst is filtered off and the solvent evaporated. The residue is taken up in dilute hydrochloric acid, the acid solution made basic and then extracted with chloroform. By removing the chloroform in vacuo and recrystallization of the residue, 3β-acetoxy-20α-methylamino-5-pregnen-11-one is obtained which is hydrolzed by refluxing in methanolic potassium hydroxide to the 3-hydroxy derivative.

A solution of 5.0 g. of 3β-hydroxy-20α-methyl-amino-5-pregnen-11-one in 250 ml. of toluene and 110 ml. of cyclohexanone is oxidized with 15.0 g. of aluminum isopropoxide by heating at reflux for two hours. Glacial acetic acid (10 ml. in 25 ml. of toluene) is added and the mixture steam distilled for one hour, then cooled. The mixture is made basic with 40% sodium hydroxide solution, cooled and extracted with chloroform. The extract is washed with water, then extracted with 5% acetic acid. The aqueous extracts are made basic, the solid filtered and recrystallized from acetonitrile to give 3,11-diketo-20-methylamino-4-pregnene.

A solution of 2.5 g. of the amine in 75 ml. of methylene chloride is reacted with sodium hypochlorite as described to give the N-chloro which is rearranged to give the 1-chloro by irradiation in trifluoroacetic acid. This salt is again N-chlorinated and rearranged as described in Example 1 to give 3,11-diketo-18-dichloro-20-methylamino-4-pregnene trifluoroacetic acid salt.

One portion (750 mg.) of this salt in aqueous ethanol is neutralized with sodium carbonate to give the base which is reacted with hydrogen chloride in ether to give the hydrochloride salt. Another portion (500 mg.) is heated at reflux in methanolic potassium hydroxide solution to give 18-hydroxy-3,11-diketo-4-conanene.

Example 17

A solution of 750 mg. of 3-keto-18-dichloro-20α-methylamino-4-pregnene trifluoroacetate salt, from Example 1, is dissolved in aqueous ethanol. Aqueous sodium carbonate solution is gradually added to give a precipitate of the free base. The base is taken into ether. The ether solution is dried and separated into 3 aliquot portions. The first is reacted with hydrogen chloride to separate the hydrochloride salt, the second with a drop of sulfuric acid to separate the sulfate salt and the last with hydrogen bromide to form the hydrobromide salt.

Example 18

3α,18 - dihydroxy - 5β-conanine-11-one (750 mg., Example 12) is heated in methanol for several hours. The residue therefrom is heated at reflux in tetrahydrofuran with 500 mg. of sodium borohydride. Quenching in acid solution and then basification gives 3α,11,18-trihydroxy-5β-conanine.

Example 19

A 500 mg. portion of 18-hydroxy-4-conanene-3-one, from Example 2, is reacted in aqueous alcohol with alcoholic hydrogen chloride. Trituration with ether gives the hydrochloride salt of the pseudo base, that is the $\Delta^{18,N}$ compound.

Example 20

A solution of 15 g. of 3β-hydroxy-20-(N-chloro-N-α-methylamino)-allopregnan-11-one, prepared similarly to the 3α-hydroxypregnane isomer of Example 12, in 150 ml. of chilled trifluoroacetic acid is irradiated as described using three 15-watt G.E. germicidal lamps for 15 minutes. The irradiated solution is then treated with 7.4 g. of trifluoroacetic anhydride solution (90% of theoretical) and permitted to stand at room temperature for one hour. The solution is evaporated under reduced pressure to leave an oily residue which is dissolved in a minimum amount of acetone, treated with petroleum ether, then ether. Such trituration induces crystallization of the desired 18-chloro ester salt, M.P. 164–169° C.

This compound (25 g.) in 380 ml. of methylene chloride is stirred rapidly with 500 ml. of hypochlorite solution for 30 minutes. The aqueous layer is removed and the process repeated three times. The organic layer is washed with brine, dried and evaporated to give the desired 3β - trifluoroacetoxy - 18-chloro-20-N-chloromethylaminollopregnan-11-one, M.P. 149° C. (dec.).

A solution of 5g. of the 18,N-dichloro intermediate in 50 ml. of trifluoroacetic acid is irradiated as above for 15 minutes. The solution is evaporated, acetone added twice and re-evaporated. Hexane is then added to separate a solid. After recrystallization, crystals of 3β-trifluoroacetoxy - 18 - dichloro-20-methylaminoallopregnan-11-one are obtained, M.P. 209–214° C. (dec.).

This compound (1 g.) is heated at reflux in methanolic sodium hydroxide for several hours. Quenching in water gives 3β,18-dihydroxy-conanine-11-one.

This is a continuing application divided out of U.S. Serial No. 88,034 filed February 9, 1961, now Patent No. 3,017,408.

What is claimed is:
1. A chemical compound of the formula:

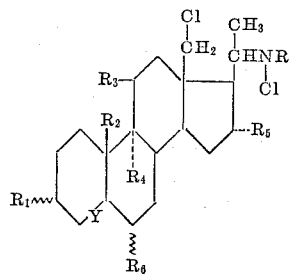

in which:
  R is lower alkyl having from one to four carbon atoms;
  $R_1$ is a member selected from the group consisting of hydroxy, keto, trifluoroacetoxy and alkanoyloxy having a maximum of 6 carbon atoms;
  $R_2$ is a member selected from the group consisting of hydrogen and methyl;
  $R_3$ is a member selected from the group consisting of hydrogen and keto;
  $R_4$ is a member selected from the group consisting of hydrogen and fluoro;
  $R_5$ is a member selected from the group consisting of hydrogen, hydroxy, acetoxy and methyl;
  $R_6$ is a member selected from the group consisting of hydrogen, methyl and fluoro; and
  Y is a member selected from the group consisting of ethylene and vinylene.

2. 18 - chloro - 3-keto-20α-(N-chloro-N-methylamino)-4-pregnene.

3. 18 - chloro - 3,11 - diketo-20α-(N-chloro-N-methylamino)-4-pregnene.

4. 18 - chloro - 3,11 - diketo - 20α - (N-chloro-N-methylamino)-4-allopregnane.

5. 18 - chloro - 3-keto-20α-(N-chloro-N-methylamino)-19-nor-4-pregnene.

6. 18 - chloro-11-keto-20α-(N-chloro-N-methylamino)-pregnan-3α-ol.

No references cited.